Oct. 25, 1966

D. BORELLO 3,280,446

APPARATUS FOR PRODUCING EXPANDED METAL PRODUCTS

Filed Aug. 10, 1965

INVENTOR
DOMENIC BORELLO
BY Amster & Rothstein
ATTORNEYS

Oct. 25, 1966 D. BORELLO 3,280,446
APPARATUS FOR PRODUCING EXPANDED METAL PRODUCTS
Filed Aug. 10, 1965 6 Sheets-Sheet 2

INVENTOR
DOMENIC BORELLO
BY Amster & Rothstein
ATTORNEYS

INVENTOR
DOMENIC BORELLO

Oct. 25, 1966  D. BORELLO  3,280,446
APPARATUS FOR PRODUCING EXPANDED METAL PRODUCTS
Filed Aug. 10, 1965  6 Sheets-Sheet 5

INVENTOR
DOMENIC BORELLO
BY Amster & Rothstein
ATTORNEYS

Oct. 25, 1966 D. BORELLO 3,280,446
APPARATUS FOR PRODUCING EXPANDED METAL PRODUCTS
Filed Aug. 10, 1965 6 Sheets-Sheet 6
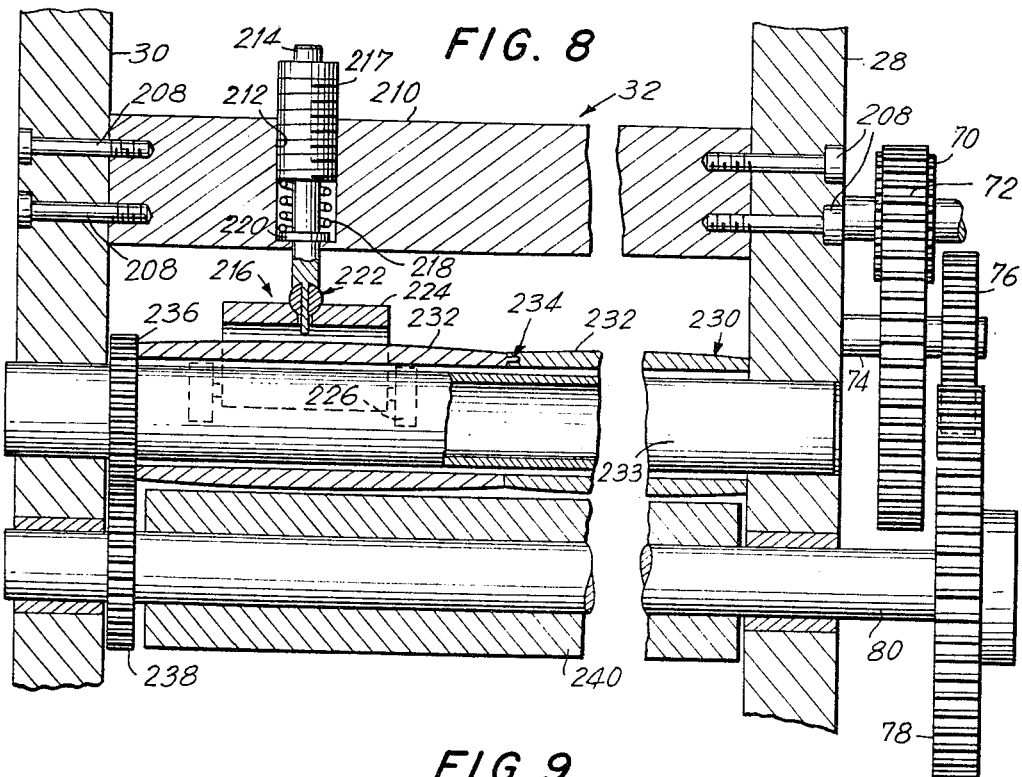
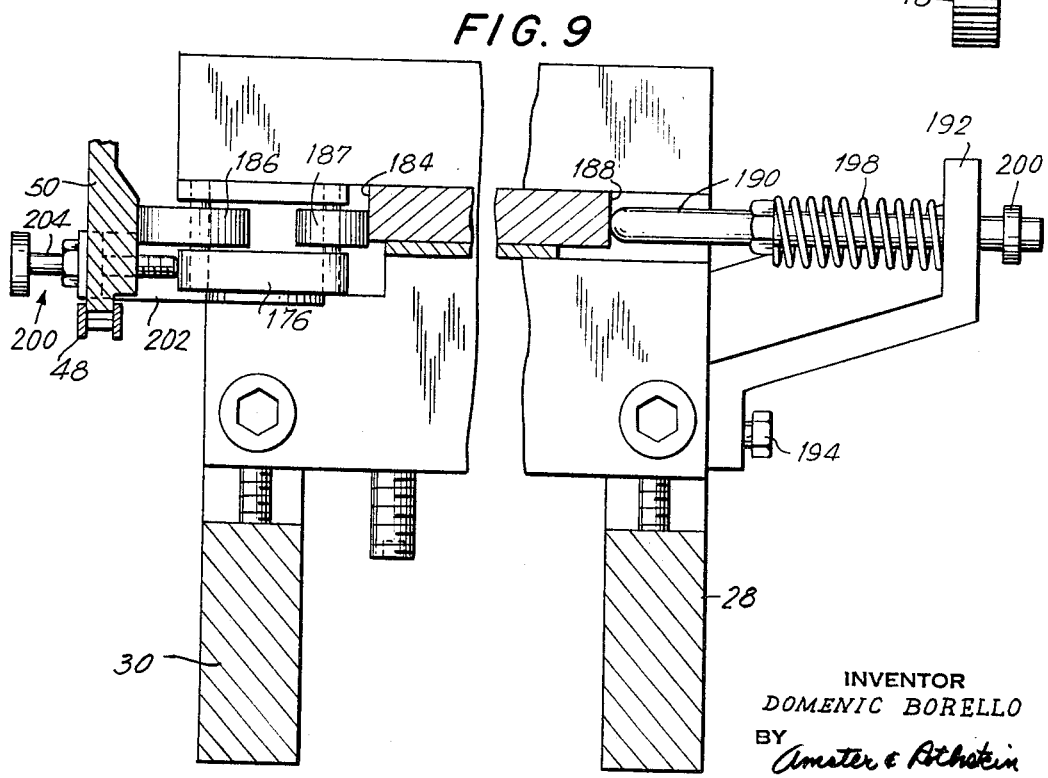
INVENTOR
DOMENIC BORELLO
BY Amster & Rothstein
ATTORNEYS

United States Patent Office 3,280,446
Patented Oct. 25, 1966

3,280,446
APPARATUS FOR PRODUCING EXPANDED
METAL PRODUCTS
Domenic Borello, 300 Pelham Road, New Rochelle, N.Y.
Filed Aug. 10, 1965, Ser. No. 478,707
12 Claims. (Cl. 29—6.2)

The present invention relates generally to the manufacture of expanded metal products, and more particularly to an improved apparatus for producing an expanded metal product.

The conversion of sheet metal into an expanded metal product wherein an arrangement of openings are produced throughout the body of said sheet metal is already well known, as is appropriate apparatus for achieving this result. The expanded metal product having a mesh-like body consisting of said arrangement of openings has many industrial uses, among the most important of which is the straining and filtering of liquids. While it is possible to produce this useful product with such apparatus as is currently available, said apparatus is not entirely satisfactory. The most significant shortcoming of said apparatus is the inability to make accurate and precise adjustments in the shearing stroke through the sheet metal which produces the openings therein, and thus in the dimensions of said openings which are ultimately produced in said sheet metal. This, in an obvious manner, is of particular significance where the produced expanded metal product is intended for use as a filter and the dimensions of the openings thereof are of critical importance.

Broadly, it is an object of the present invention to overcome the foregoing and other shortcomings of the prior art. Specifically, it is an object to provide an improved apparatus for producing expanded metal products where such improvements result in an ability to make adjustments in the major movements of the parts of said apparatus which effect the parameters of the resulting expanded metal product, and thus provide said apparatus with a greatly improved ability to produce significant variation in the resulting expanded metal product. In this connection, the structural features of said apparatus permitting such adjustments and significant variation in the expanded metal product are compatible with rapid and automatic operation of the apparatus, and thus said improved apparatus has a production rate equaling or exceeding that of the best of the prior art machines.

Another object of the present invention is to provide an apparatus capable of producing expanded metal products to precise dimensions, both as to the openings therein and the network of strands forming the body of said product.

In achieving the foregoing objects, it is still another object to provide an expanded metal producing apparatus which has a minimized number of movable parts and in which said movable parts are actuated into movement in timed sequence with each other to provide an efficient automated cycle of operation for said apparatus.

An apparatus for producing an expanded metal product demonstrating features of the present invention includes a pair of metal-shearing dies located at the end of a main line of movement for said apparatus and presenting a pair of shearing edges for converting sheet metal fed along said path of movement into an expanded metal product. One of said dies is stationary, while the other die has various degrees of movement including movement in opposite directions along a path of movement past the shearing edge of said stationary die. Such movement constitutes the shearing stroke of said movable die. Additionally, said apparatus includes a resilient mounting for the movable die and appropriate powering mechanisms for actuating said movable die into movement, said movement of the movable die being more particularly in opposition to the urgency of said resilient mounting. Thus, said movable die mounting functions to return the die to a predetermined original starting position during each cycle of operation. A significant structural and noteworthy feature of the present apparatus resides in the provision of adjustable means for changing the starting position of said movable die while still maintaining the operative connection of said die to the mechanisms which actuate the same into movement. This ability to change the starting position of the movable die provides an ability to effect a change in the ending position of said die, which as regards the shearing stroke of said movable dies of significant importance in changing the dimensions of the openings of the expanded metal product produced by said apparatus. That is, by lengthening the distance that the shearing edge of the movable die is actuated past the shearing edge of the stationary die, it is possible to increase the width and length dimensions of the openings produced during such shearing movement, whereas lessening the extent of travel of said movable shearing edge past said stationary shearing edge decreases these dimensions.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 5:
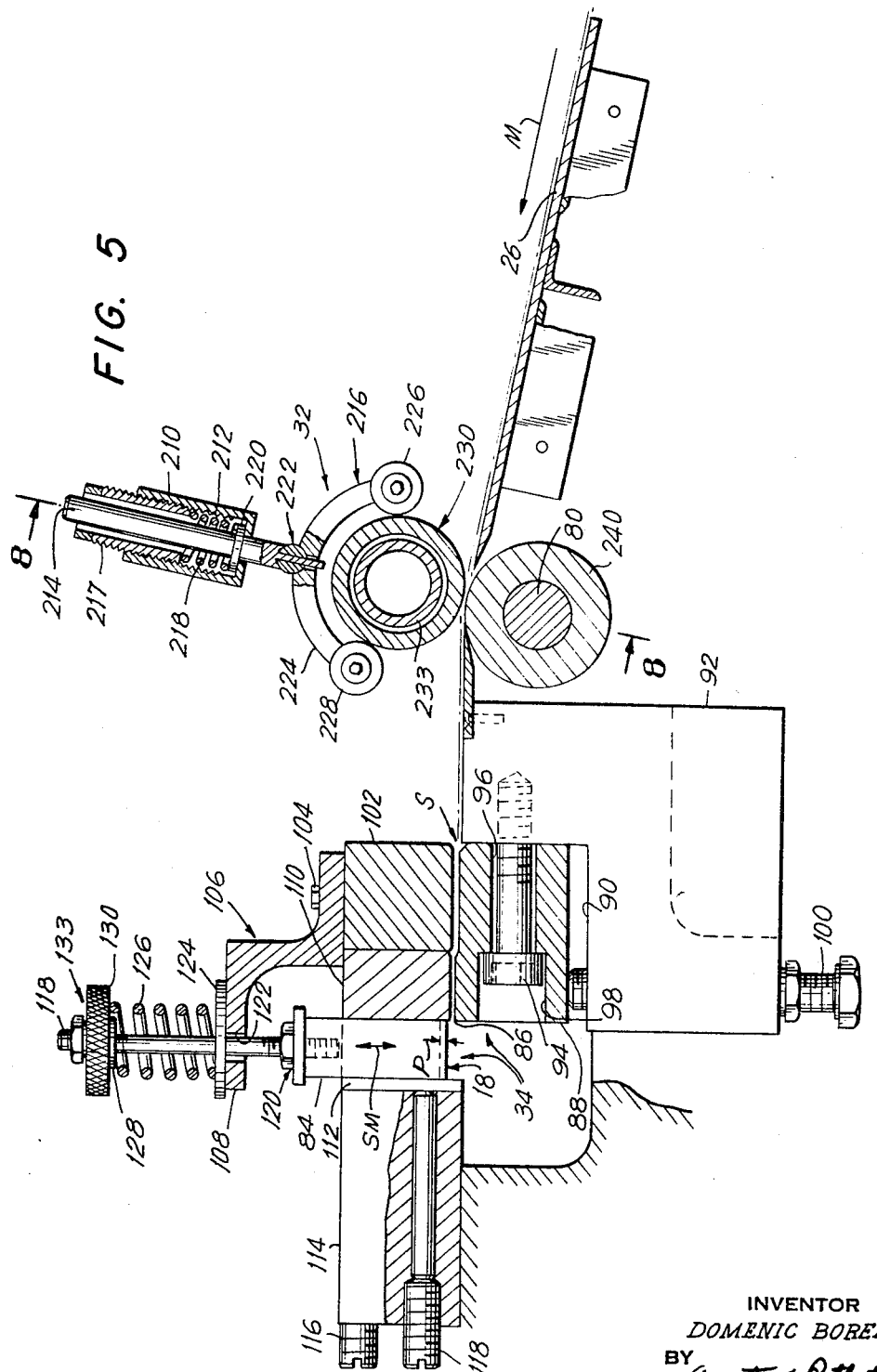
FIG. 5 is an elevational view, in section taken on line 5—5 of FIG. 4, illustrating further details of construction of said shearing dies and material feeding means.
Figure 7:
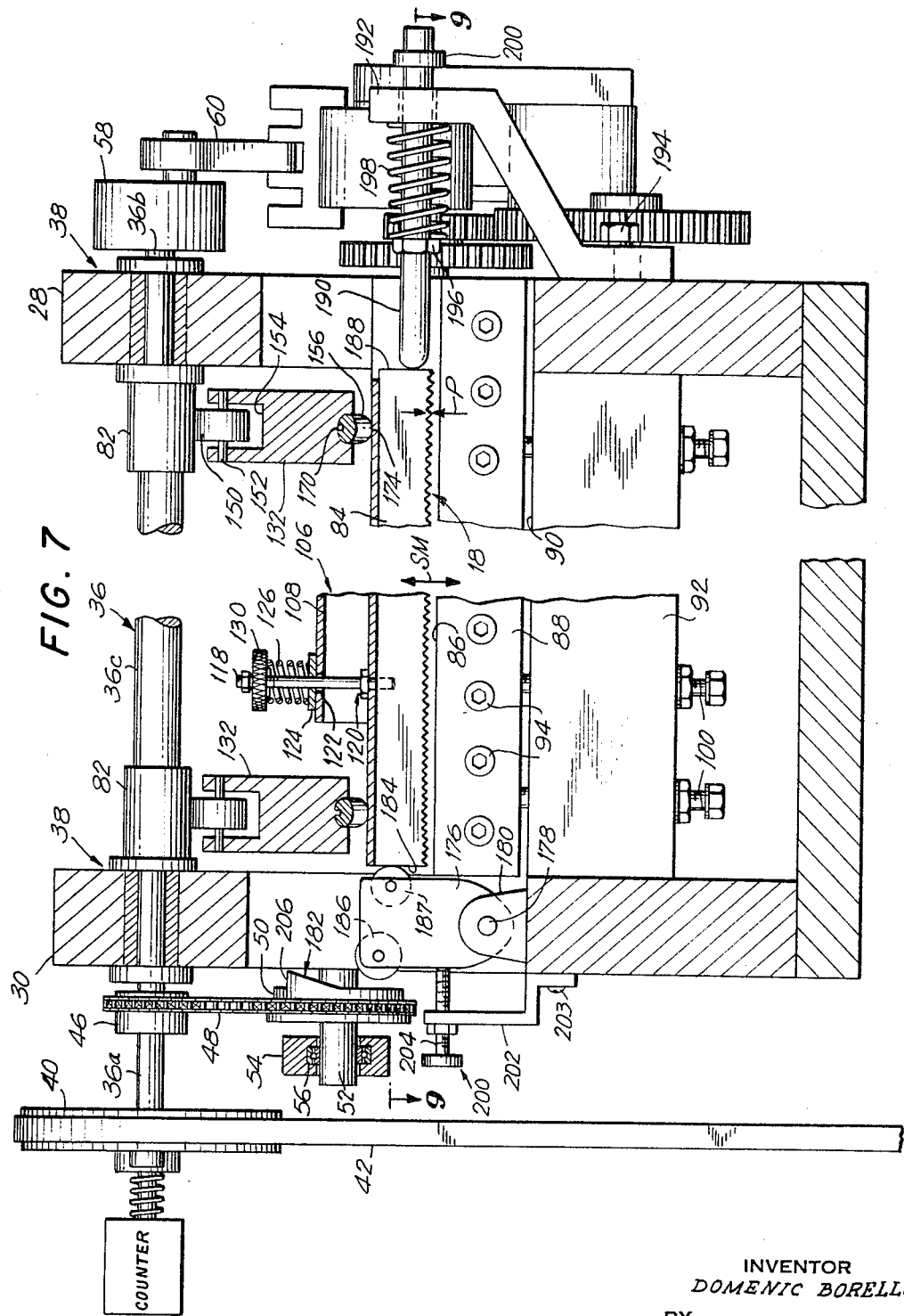
FIG. 7 is a front elevational view, in section taken on line 7—7 of FIG. 4, illustrating further details of the mounting and stroke-adjusting structure for said upper movable shearing die.

FIG. 8 similarly is a front elevational view, but in section taken on line 8—8 of FIG. 5, and illustrating structural details of the material feeding means; and FIG. 9 is a plan view, in section taken on line 9—9 of FIG. 7, illustrating the structure for actuating and adjusting said upper movable shearing die in its transverse movement.

Figure 1:
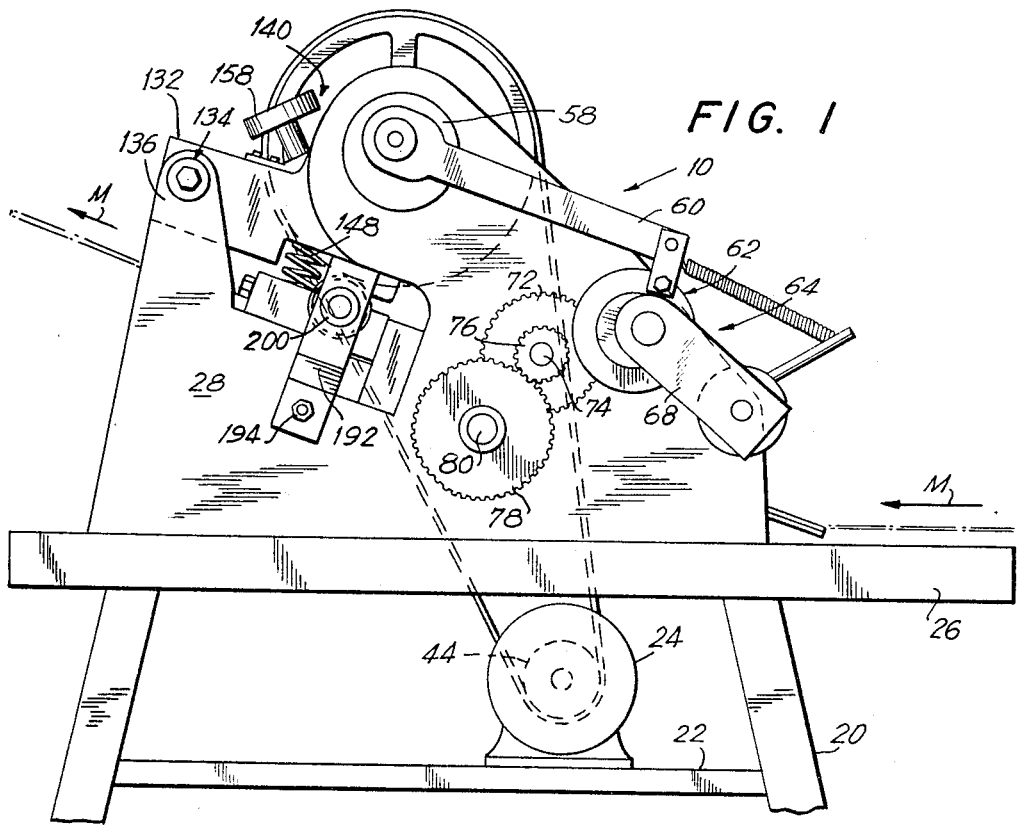
FIG. 1 is an elevational view of an apparatus for producing expanded metal and demonstrating features of the present invention.
Figure 2:
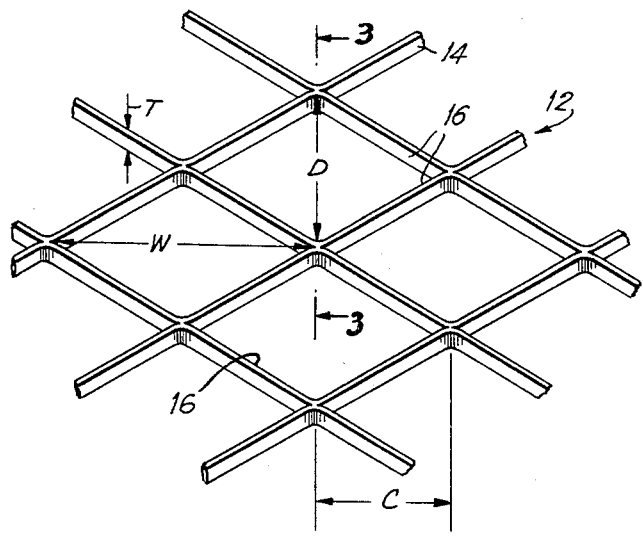
FIG. 2 is a perspective view, on a greatly enlarged scale, of a small portion of expanded metal of the type which is produced by the machine of FIG. 1.
Figure 3:
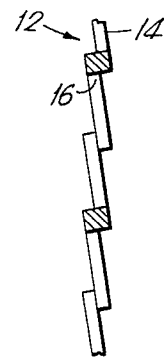
FIG. 3 is a sectional view projected from FIG. 2 and taken on line 3—3 of FIG. 2.

Reference is made now to the drawings, and in particular to FIGS. 1–4 in which there is shown an apparatus, generally designated 10, for producing an expanded metal product such as is generally designated 12 in FIGS. 2 and 3. The product 12 is fabricated from solid metal sheeting into the form shown which consists of a network of strands of metal 14 and substantially diamond-shaped openings 16. Having reference only briefly at this time to FIG. 5, it will be understood that the reference numeral 84 designates a movable upper die of a pair of metal-shearing dies 34 which are employed in the apparatus 10 to produce said expanded metal product 12. Moreover, it will be noted that the shearing edge of said movable die 84 is formed with a row of teeth 18 having a height or pitch, herein designated P. Returning now to FIGS. 2 and 3, it will be further understood that the dimensions D and W of a typical opening 16 are a function of both the shape of the teeth 18 and also the depth of penetration of these teeth into the metal sheeting 12 during shearing movement of the upper die 84 past the shearing edge of the other stationary lower die. That is, in the normal operation of the apparatus 10, said shearing movement of the upper movable die 84 beyond said other shearing edge is limited to some distance less than the pitch P, and thus the metal sheeting 12 is provided with the strand network 14 rather than being severed along the edge of the teeth 18. Further, the actual depth of shearing movement in turn effects the size or dimensions W and D of the openings 16.

Variation in the rate of material fed through the apparatus 10 and thus past the cooperating shearing edges of the pair of shearing dies, during intervals between shearing movement of said movable die 84, in an obvious manner effects the width (dimension T) of the strands 14. The final significant characteristic of the expanded metal product 12 is the center-to-center spacing C between the openings 16 in adjacent rows in the product 12, this spacing being a function of the length of transverse or lateral movement of the movable die 84 along the stationary shearing edge incident to shearing movements past said edge. From the foregoing, it should thus be appreciated that the structure of the apparatus 10 which permits adjustment and regulation of those functioning parts of said apparatus which effect the parameters of the expanded metal product just described are of the utmost importance.

Figure 4:
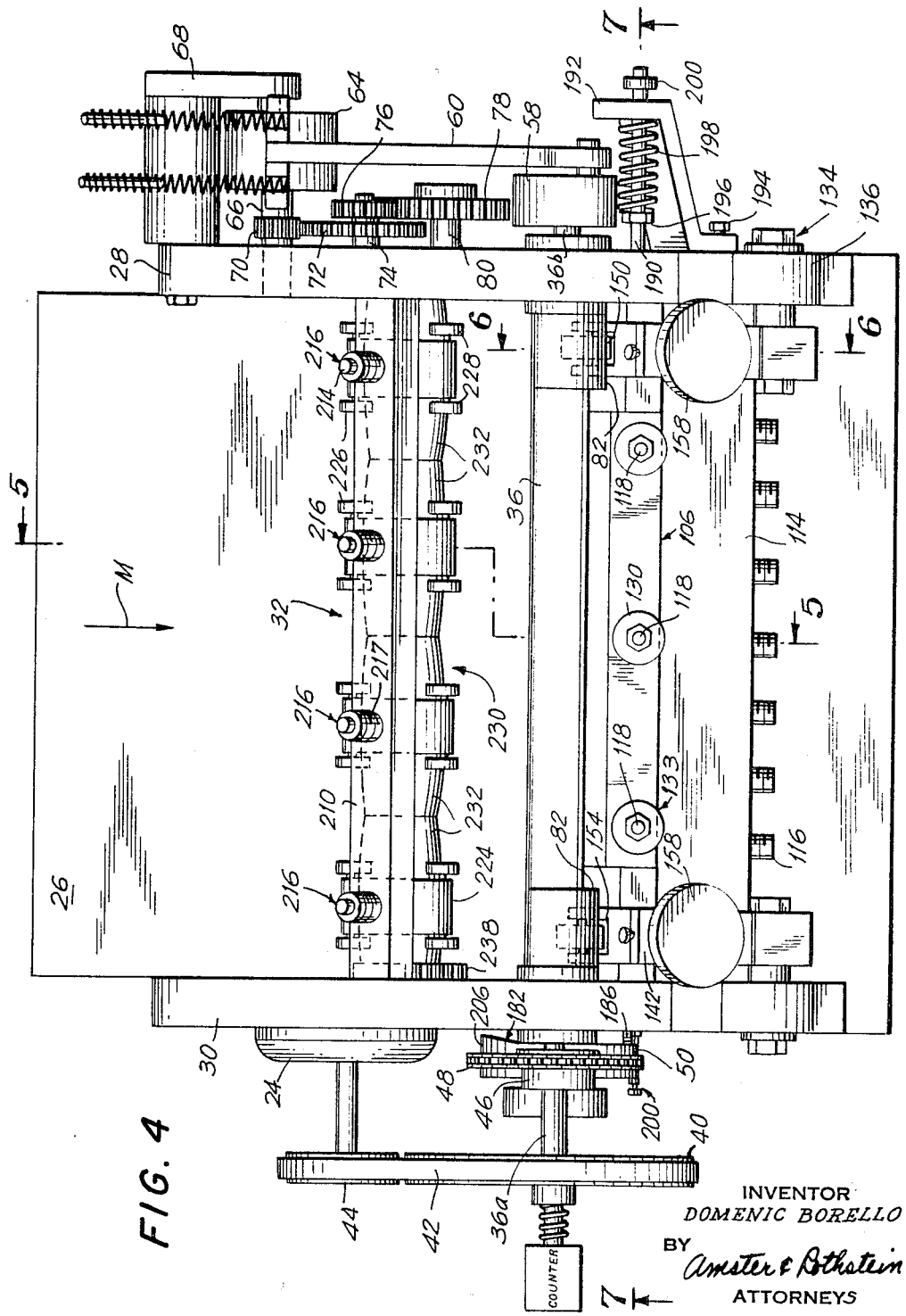
FIG. 4 is a plan view of said FIG. 1 apparatus, illustrating the shearing dies thereof in the foreground and the feeding mechanism in the background.

Turning now more particularly to such structure, the apparatus 10 is seen in FIGS. 1, 4, to include a base 20 having a shelf 22 mounting an electric motor 24 for powering the movable parts thereof. Above the shelf 22 is a plate 26 and a pair of spaced upstanding yokes 28, 30 supporting therebetween the various shafts and major functioning parts of the apparatus 10. Additionally, the yokes 28, 30 define a main line of movement M for the metal sheeting which is processed through the apparatus 10. As is best shown in FIGS. 4, 5, this metal sheeting is processed along said path of movement M by a feeding means, herein generally designated 32, which is effective to move the material along said path M up to and between a pair of shearing dies, herein generally designated 34. The shearing action of the dies 34 are effective to convert the solid sheeting into an expanded metal product such as is designated 12 in FIGS. 2, 3.

As is best seen in FIGS. 1 and 7, a main shaft 36 is appropriately journalled for rotation, as at 38, in each of the yokes 28 and 30. A section of length 36a of said main shaft 36 extends beyond the yoke 30 and fixedly mounted thereon is a pulley 40 about which is trained a belt 42 trained at its other end about a pulley 44 of the motor 24. A sprocket gear 46 is fixedly mounted on the shaft extension 36a and drives an endless chain 48 trained about a compound sprocket gear and cam 50 which is fixedly mounted on a shaft 52 supported for rotation between the yoke 30 and a support 54 housing a ball bearing mounting 56 for said shaft 52. As will be described in more detail subsequently, the rotational movement imparted to the compound 50 via the chain drive 48 is employed to actuate the movable die 84 transversely of the path of movement M and thus provides the center-to-center spacing C in the expanded product 12 produced by said apparatus 10.

The opposite end of the main shaft 36 also extends, as at 36b, beyond the other yoke 28 and has fixedly mounted thereon a crank 58 mounting a crank arm 60 which at its other end is operatively connected, as at 62, to a pawl and ratchet wheel drive unit, herein generally designated 64. This drive unit may be any of a number of commercially available units which has a pawl adapted to successively drive a ratchet wheel in rotation, such as for example that supplied by The Formsfarg Company, of Warren, Michigan. The drive unit 64, as is best shown in FIG. 4, is effective to rotate a shaft 66 journalled for rotation in the yoke 28 and in a support 68 secured to said yoke. Fixedly mounted on the shaft 66 is a gear 70 in meshing engagement with a gear 72 fixedly mounted on a idler shaft 74 of the material feed means 32. The idler shaft 74 also mounts a gear 76 which is in meshing engagement with a gear 78 fixedly mounted on the lower shaft 80 of said material feed means 32. In this manner rotational power is distributed via the pawl and ratchet drive unit 64 and the gear trains 70, 72, 76 and 78 to power the material feed means 32.

Figure 6:
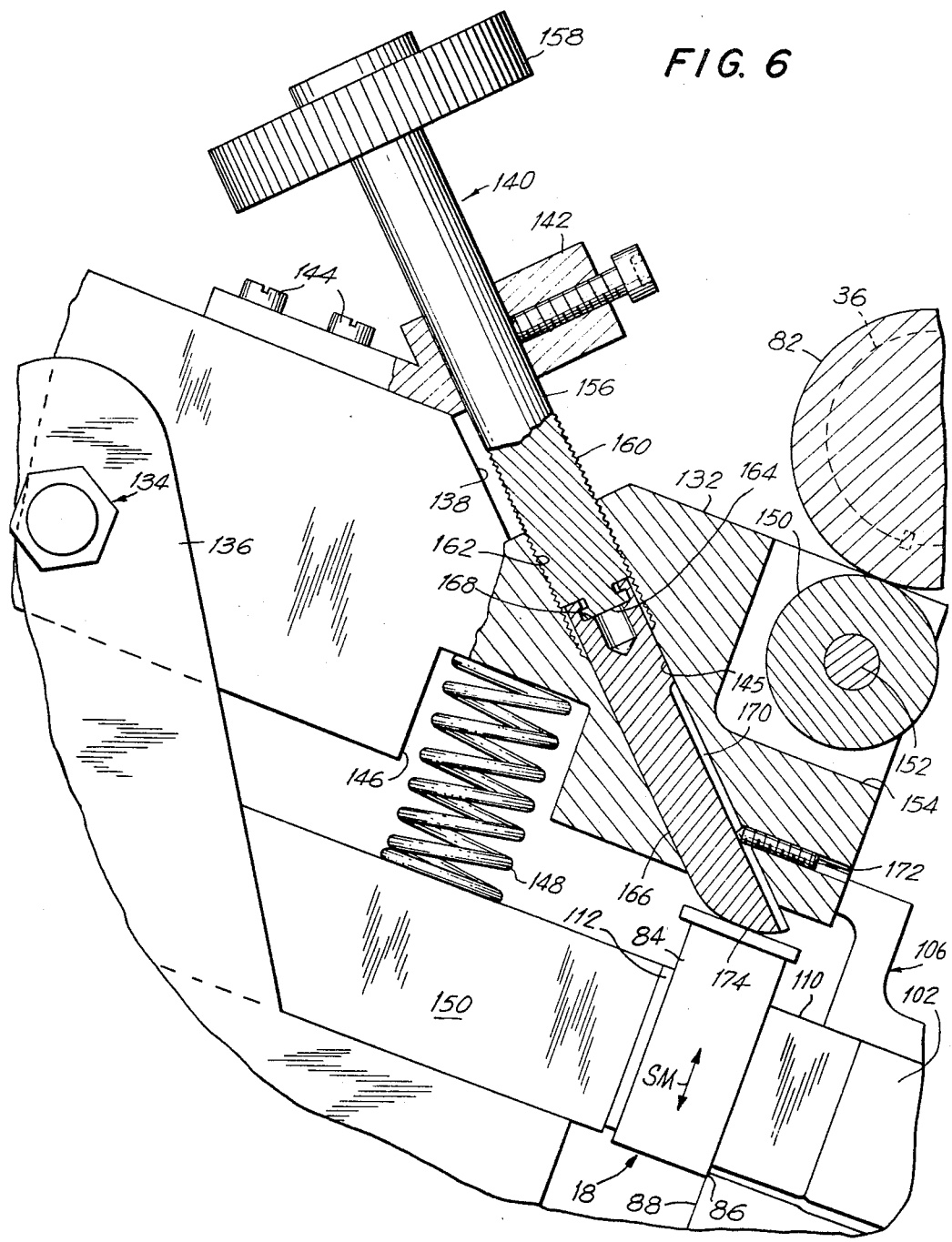
FIG. 6 is a detailed elevational view, on an enlarged scale and in section taken on line 6—6 of FIG. 4, best illustrating the structure for mounting the upper shearing die and for making adjustments in the depth of shearing movement of said die.

Returning again to the distribution of power of the main shaft 36, as best shown in FIGS. 6 and 7, there is fixedly mounted on the medial section, more specifically designated 36c, of said shaft a pair of cams 82 which are effective to impart reciprocating shearing movement to the movable die 84 past the shearing edge 86 of the other stationary shearing die 88 of the apparatus 10. The stationary die 88 is supported in a recess 90 of a support block 92 disposed between the yokes 28, 30 and beneath the path of movement M. Connection between the block 92 and die 88 is preferably made by plural bolts 94 disposed through oversized through bores 96 and seated against shoulders formed by counter bores 98. Plural threaded members 100 extend from beneath and through the support block 92 into contact with the stationary die 88 and are effective, in an obvious manner, of adjusting the vertical position of said stationary die 88 to the extent permitted by the clearance of the oversized through bores 96. Mounted transversely between the yokes 28, 30 and immediately above the stationary die 88 with a sufficient clearance space S left therebetween to accommodate the sheet metal being processed along the path of movement M to the shearing dies 84, 88 is a support block 102 forming part of the mounting for the movable die 84. Connected medially of said support block 102, as at 104, is an S-shaped mounting bracket 106 having a leg 108 extending laterally beyond the vertically aligned support block 102 and stationary die 88. The movable die 84 is resiliently mounted from said leg 108 and controlled in vertical shearing movement along a path of movement SM between an accurately machined block 110 formed integral with the support block 102 and a similarly accurately machined plate 112 supported on a laterally extending support 114 located in a clearance position on opposite sides of the path of movement M. Metal screws or other appropriate connecting members 116 are provided to secure the plate 112 to the support 114 while permitting slight adjusting movement in said plate 112 upon threadable adjustment of the threaded member and thrust pin herein collectively designated 118.

Considering FIG. 4 now in conjunction with FIGS. 5 and 7, it will be noted that the movable die 84 has several upstanding pins 118, totaling three in number, threadably disposed at strategic spaced locations in the upper portion of said die. A nut and washer arrangement 120, which does not readily loosen when subjected to vibration, is advantageously employed to lock each pin 118 in its position within the die 84. Each of the pins 118 is extended through an oversized opening 122 in the bracket leg 108 and has mounted on said extended end, in the order now named, a washer 124, a spring 126, a lock nut 128, a threadable adjusting member 130, and finally a lock nut and washer arrangement 132. The spring 126 is seated between the larger diameter members 124, 130 and is effective to normally bias the movable die 84 along the path of movement SM in a direction away from the stationary lower die 88. The force of this spring urgency is a function of resistance to compression of the spring 126 which in turn is determined by the adjusted position of the member 130 on the upper threaded end of each mounting pin 118.

Turning now more particularly to FIGS. 1, 6 and 7, it will be noted that located on opposite sides of the mounting bracket 106 and adjacent to each of the yokes 28 and 30 is a rocking arm 132 interposed between the movable die 84 and each of the cams 82 fixedly mounted on opposite ends of the intermediate section 36c of the main shaft 36. The interposed position of the rocking arm 132 will of course be appreciated as limiting the extent of movement of the movable die 84 along the path of movement SM under the bias of the springs 126. As is best shown in FIG. 6, each rocking arm 132 is identically constructed and is pivotally mounted at one end, as at 134, to a support section 136 formed integral with each of the yokes 28, 30. A clearance notch 138 for an adjustable member, herein generally designated 140, is provided substantially medially of the rocking arm 132. An angled bracket 142 is bolted, as at 144, to the arm 132 and receives therethrough said adjusting member 140 which additionally is extended into a through bore 145 inclined to the horizontal at an appropriate angle to locate the lower end of said member 140 in a position for contacting the upper surface of the movable die 84. Beneath the clearance notch 138 is a seat 146 for a spring 148 disposed therein and seated at its other end against a block 150 formed integral with the side frame structure of the apparatus 10, and which spring 148 is effective to normally bias the rocking arm 132 against the cam 82 of the main powering shaft 36. Smooth, rolling contact with the cam 82 is achieved by a roller 150 rotatably mounted on a pin 152 straddling a notched-out corner 154 of the body of said rocking arm 132.

As is best shown in FIG. 6, a preferred embodiment for the adjusting member 140 includes an upper cylindrical section 156 having a knob 158 fixed on one end thereof for manipulating said member 140 in rotation. Opposite the knob 158 the cylindrical section 156 is provided with external threading 160 in threaded engagement with the upper threaded portion 162 of the through bore 145. The threaded end of section 156 terminates in a circular configuration 164 which in the assembly of this rear section with a front section 166 is slidably received in an under-cut notch 168, said configuration 164 and notch 168 functioning substantially as a dovetail joint which maintains the sections 156, 166 connected while permitting rotation of section 156 relative to the section 166.

A keyway 170 is provided lengthwise of the front section 166 and a threaded member 172 extends into this keyway to prevent rotation of the front section 166 with the rotated rear section 156. Thus, by manipulating the rear section 156 in rotation, as by turning the knob 158, the overall effect is to threadably adjust this section along the threads 162 of through bore 145 which in turn has the desired effect, depending upon the direction of rotation thereof, of either thrusting the front section 166 further out of said bore 145 or retracting the same within said bore. Inasmuch as an end bearing surface 174 is in contact with the movable die 84, when the member 140 is rotatably adjusted to extend further through the bore 145, the movable die is moved downwardly towards the stationary die 88 against the urgency of the mounting springs 126. Thus the starting position of said movable die 84, by virtue of being moved closer to the stationary die 88, when actuated into movement along the path SM by the rotating cam 82 provides an ending position of said movable die 84 further in position past the shearing edge 86 of the stationary die 88 to thus increase the overall extent or depth that said movable die 84 is actuated through shearing movement. Conversely, when the member 140 is adjusted to retract the front section 166 within the bore 145, the result is that the starting position of the movable die 84 is moved to a location further from the shearing edge 86 of the stationary die 88. Thus of the total movement imparted to this movable die, the portion of said movement through which the shearing teeth 18 on the movable die 84 actually pass beyond the other shearing edge 86 is lessened. Thus, by appropriate manipulation of the member 140 it is possible to provide accurate control and regulation over the dimensions W and D of the openings 16 in the expanded metal product 12 produced by the apparatus 10.

Attention is now directed specifically to FIGS. 4, 7 and 9 for a more detailed consideration of the sprocket and cam compound 50 which is effective to actuate the movable die 84 along a transverse path substantially parallel to the shearing edge 86 during intervals between shearing movements along the path SM past said shearing edge 86. To this end there is provided a rocking member 176 pivotally mounted, as at 178, to an integral ear 180 of the support structure of the apparatus 10. The position of the rocking member 176 is between the cam face 182 of the compound 50 and a side wall 184 of the movable die 84, said rocking member 176 having rollers 186 and 187 rotatably mounted thereon for making smooth rolling contact with said cam face 182 and side wall 184, respectively. As best shown in FIG. 7, the movable die 84 at its opposite side wall 188 is in contact with a rod 190 mounted in a bracket 192 connected as at 194 to the frame structure of the apparatus 10. An end length portion of the rod 190 is provided with threads and has threadably secured thereon a nut 196 which seats a compression spring 198 seated at its other end against the bracket 192. A movement limiting nut 200 is threadably engaged on said threaded section of the rod 190 outwardly of the bracket 192. Thus, in an obvious manner, the movable die 84 is biased under the urgency of the spring 198 acting through the rod 190 into a position of contact with the roller 187 of the rocking member 176. The rocking member 176 is thus subjected to the urgency of the spring 198 and is biased into counterclockwise movement about the pivot axis 178 until contacting an adjustable stop, herein generally designated 200. Stop 200 includes a bracket 202 connected as at 203 to the apparatus support frame structure and an adjusting member 204 threadable in said bracket 202 and having an end surface bearing against and thus limiting the rotative movement of the rocking member 176. Thus, the adjusting position of the member 204 determines the starting position of the movable die 84 relative to its transverse path of movement along the stationary shearing edge 86. This starting position in turn effects the point on the cam rise 206 of the cam face 182 at which contact is made during rotation of the compound 50 with the roller 186 of the rocking member 176 and thus the extent of transverse die movement. In other words, if contact is made at the beginning of said cam rise, then the transverse stroke of the movable die 84 is for the substantial height of said cam rise. Conversely, if contact is not made with said cam rise 206 until the highest point on said cam rise, then the transverse stroke of the movable die 84 is of a substantially minimized degree. Thus, the member 204 provides both a simple and accurate way of adjusting the center-to-center dimension C of the finished product 12.

Not only does rotation of the compound 50 actuate the movable die 84 through transverse movement along the shearing edge 86, but it is further provided that this transverse movement occur during intervals between shearing movement of said movable die. This is obtained by so arranging the starting rotative position of the compound 50 that contact between the cam rise 206 thereon and the rocking member 176 is made only during that portion of the revolution of the main shaft 36 when the cams 82 also mounted on the said power shaft 36 are not actuating said movable die 84 through shearing movement SM.

Particular reference is now made to FIGS. 4, 5 and 8 which best illustrate the details of construction of the material feed means 32. Mounted, as at 208, between the supporting yokes 28, 30, and in a raised position relative to the path of movement M is a supporting member 210 having vertically oriented spaced counter bores 212 machined therein. As is best shown in FIG. 5, an extending rod 214 of a holding member, generally designated 216, is disposed through the threaded counter bore 212 and through a threadable member 217 threadably engaged in said counter bore 212 and serving as an adjustable stop for a spring 218 seated at one end against an end surface of the member 217. Fixedly mounted along the length of the rod 214 is a stop 212 against which the opposite end of the spring 218 is seated to place the rod 214 under a spring bias downwardly in the direction of the path of movement M. At the lower end of the rod 214 is a universal joint 222 connecting said rod 214 to an arcuate yoke 224 having rollers 226, 228 at opposite ends thereof in surface contact against an upper feed roller, generally designated 230, of the material feed means 32.

As best seen in FIG. 8, said upper feed roller 230 includes a plurality of crowned cylindrical sections, herein individually and collectively designated 232, which are disposed end-to-end about an upper support shaft 233 journalled for rotation at opposite ends in the support yokes 28, 30. An appropriate drive connection between said sections 232, preferably in the form of circumferentially located cooperating pins and openings 234 are provided in adjacently located end surfaces thereof and are effective to provide rotation in unison of said plural sections 232 about the support shaft 233. This drive connection, however, permits each of said sections 232 to be selectively biased downwardly in the direction of the path of movement M by an associated holding member 216. As best shown in FIG. 4, the upper feed roller 230 consists of pairs of cylindrical sections 232 and holding members 216 equaling four in number at strategic locations across the path of movement M between the yokes 28, 30. From the preceding description, it should be readily appreciated that the biasing spring pressure applied against each of the sections 232 can be individually adjusted merely by threaded adjustment of the member 217 which in turn regulates the resistance of the spring 218 and thus the degree of firmness of the contact made by said section against the material being fed along the path of movement M and threaded beneath said upper roller 230 and a lower feed roller.

Turning again to a consideration of FIG. 8, it will be noted that an end section of the sections 232 is formed integral with a gear 236. This gear is in meshing engagement with a gear 238 fixedly mounted on the shaft 80 which, in the manner previously described, is powered in rotation by the main power shaft 36 via the drive unit 64 and gear trains 70, 72, 76 and 78. Fixedly mounted on the shaft 80 between the yokes 28, 30 is a lower feed roller 240 which, in an obvious manner, cooperates with the upper feed roller sections 232 in moving material interposed therebetween along the path of movement M to the shearing dies 84, 86. Thus, merely by making appropriate adjustment in the drive unit 64 to increase or lessen the extent of rotative movement transmitted by this unit via the gear trains 70–78 during each revolution of the main shaft 36, it is possible to vary the extent of movement of material beyond the shearing edge 86, and thus vary the width T of the strands 14. Moreover, accurate control over the direction of feed of the material is achieved by the ability to make individual adjustments in the degree of pressure that is exerted against said material by the plural upper feed roller sections 232.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In an apparatus for producing expanded metal including a pair of metal-shearing dies presenting a cooperating pair of shearing edges, one of which dies is movable in opposite directions along a first path of movement past said shearing edge of said other die and also in opposite directions along a transverse path of movement substantially parallel to said shearing edge, means for mounting said movable die comprising support structure located along at least one of said paths of movement thereof, resilient means operatively connected between said support structure and said movable die for supporting said movable die from said support structure and also biasing said movable die into a predetermined starting location along said first and second paths of movement, and means for alternatively actuating said movable die through movement along said first and second paths of movement against the urgency of said resilient means.

2. In an apparatus for producing expanded metal including a pair of metal-shearing dies presenting a cooperating pair of shearing edges, one of which dies is movable in opposite directions along a first path of movement past said shearing edge of said other die and also in opposite directions along a transverse path of movement substantially parallel to said shearing edge, an improved mounting for said movable die comprising support structure located along at least one of said paths of movement thereof, resilient means operatively connected between said support structure and said movable die for supporting said movable die from said support structure and also biasing said movable die into a predetermined starting location along said first and second paths of movements, and camming means for alternatively actuating said movable die from said starting location and through movement along said first and second paths of movement against the urgency of said resilient means.

3. In an apparatus for producing expanded metal including a pair of metal-shearing dies presenting a cooperating pair of shearing edges, one of which dies is movable in opposite directions along a first path of movement past said shearing edge of said other die and also in opposite directions along a transverse path of movement substantially parallel to said shearing edge, an improved mounting for said movable die comprising support structure located along at least one of said paths of movement thereof, resilient means operatively connected between said support structure and said movable die for supporting said movable die from said support structure and also biasing said movable die into a predetermined starting location along said first and second paths of movement, camming means for alternatively actuating said movable die from said starting location and thorugh movement along said first and second paths of movement against the urgency of said resilient means, pivotally mounted actuating means interposed between said camming means and said movable die for transmitting the movement of said camming means to said movable die, and adjusting means for adjusting said predetermined starting location of said movable die by movement thereof along said first and second paths of movement while maintaining said interposed actuating means in contact with said movable die to thereby permit adjustment in the shearing and transverse movements of said movable die along said respective first and second paths of movement.

4. An expanded metal producing apparatus as defined in claim 3 wherein said adjusting means for said shearing movement along said first path of movement includes a threadable member carried on said interposed actuating means and effective upon threaded adjustment to change the starting location of said movable die relative to said shearing edge of said other die, such change being effective to vary the extent of shearing movement of said movable die past said shearing edge which is ultimately produced by said camming means.

5. An expanded metal producing apparatus as defined in claim 3 wherein said adjusting means for said transverse movement along said second path of movement includes a stop member adjustable in position along said second path of movement and effective upon adjustment in position to vary the starting position of said transverse movement relative to an established ending position thereof to thereby vary the overall length of said transverse movement.

6. In an apparatus for producing expanded metal including a pair of metal-shearing dies presenting a cooperating pair of shearing edges, one which dies is movable in opposite directions along a first path of movement past said shearing edge of said other die and also in opposite directions along a transverse path of movement substantially parallel to said shearing edge, an improved mounting for said movable die comprising support structure located along said first path of movement thereof, resilient means operatively connected between said support structure and said movable die for supporting said movable die from said support structure and also biasing said movable die into a predetermined starting location along said first and second paths of movement, camming means for alternatively actuating said movable die from said starting location and through movement along said first and second paths of movement against the urgency of said resilient means, a first and second pivotally mounted actuating means interposed between said camming means and said movable die for transmitting the movement of said camming means to said movable die, said first actuating means being in surface contact with said camming means and movable die, respectively, and effective to actuate said movable die into movement along said first path of movement past said shearing edge of said other die, and adjusting means carried on said first actuating means for varying the dimension thereof between said surfaces thereof in contact with said camming means and movable die to change the starting location of said movable die relative to said shearing edge of said other die, such change being effective to vary the extent of shearing movement of said movable die past said shearing edge which is ultimately produced by said camming means.

7. An expanded metal producing apparatus as defined in claim 6 including additional adjusting means for adjusting the extent of transverse movement of said movable die along said second path of movement and including a stop member adjustable in position along said second path of movement and effective upon being adjusted in position to vary the starting portion of said transverse movement relative to an established ending position thereof to thereby vary the overall length of transverse movement.

8. An expanded metal producing apparatus as defined in claim 6 wherein said adjusting means which is carried on said first actuating means is preferably a threadable member having an end which makes surface contact with said movable die and which is effective, upon threaded adjustment, to change said starting location of said movable die along said first path of movement.

9. In an apparatus for producing expanded metal including a pair of metal-shearing dies presenting a cooperating pair of shearing edges, support structure for said apparatus defining a main path of movement to said pair of dies, and improved means for feeding material along said path of movement including a pair of upper and lower feed roller means contacting opposite sides of material adapted to be interposed therebetween and moved along said path of movement, a pair of supporting shafts disposed internally of said respective feed roller means and operatively disposed in meshing engagement with each other for powering said feed roller means in opposite directional rotation, said upper feed roller means comprising plural rollers disposed loosely about said supporting shaft in positions adjacent to each other and in driving connection with each other, and individual biasing means for urging each of said plural upper feed rollers in the direction of said lower feed roller means for adjusting the contact made by said upper and lower feed roller means against said material interposed therebetween.

10. In an apparatus for producing expanded metal including a pair of metal-shearing dies presenting a cooperating pair of shearing edges, support structure for said apparatus defining a main path of movement to said pair of dies, and improved means for feeding material along said path of movement including a pair of upper and lower feed roller means contacting opposite sides of material adapted to be interposed therebetween and moved along said path of movement, a pair of supporting shafts disposed internally of said respective feed roller means and operatively disposed in meshing engagement with each other for powering said feed roller means in opposite directional rotation, said upper feed roller means comprising plural rollers disposed loosely about said supporting shaft in positions adjacent to each other and having circumferentially spaced axial projections and openings in the adjacently located surfaces thereof for interfitting one with the other to provide a driving connection with each other, and individual biasing means for urging each of said plural upper feed rollers in the direction of said lower feed roller means for adjusting the contact made by said upper and lower feed roller means against said material interposed therebetween.

11. In an apparatus for producing expanded metal including a pair of metal-shearing dies presenting a cooperating pair of shearing edges, one of which dies is movable in opposite directions along a first path of movement past said shearing edge of said other die and also in opposite directions along a transverse path of movement substantially parallel to said shearing edge, means for mounting said movable die comprising support structure located along at least one of said paths of movement thereof, resilient means operatively connected between said support structure and said movable die for supporting said movable die from said support structure and also biasing said movable die into a predetermined starting location along said first and second paths of movement, means for alternatively actuating said movable die through movement along said first and second paths of movement against the urgency of said resilient means, and means for feeding material to and past said dies including a pair of upper and lower feed roller means contacting opposite sides of material adapted to be interposed therebetween and effective to feed such material upon rotation of said feed roller means, a pair of supporting shafts disposed internally of said respective feed roller means and operatively disposed in meshing engagement with each other for powering said feed roller means in opposite directional rotation, said upper feed roller means comprising plural rollers disposed loosely about said supporting shaft in positions adjacent to each other and in driving connection with each other, and individual biasing means for urging each of said plural upper feed rollers in the direction of said lower feed roller means for adjusting the pressure of the contact made by said upper and lower feed roller means against said material interposed therebetween.

12. An expanded metal producing apparatus as defined in claim 11 wherein said plural rollers of said upper feed roller means preferably have circumferentially spaced projections and openings in the adjacently located surfaces thereof for interfitting one with the other to provide said driving connection with each other.

No references cited.

RICHARD H. EANES, JR., *Primary Examiner.*